Patented June 29, 1937

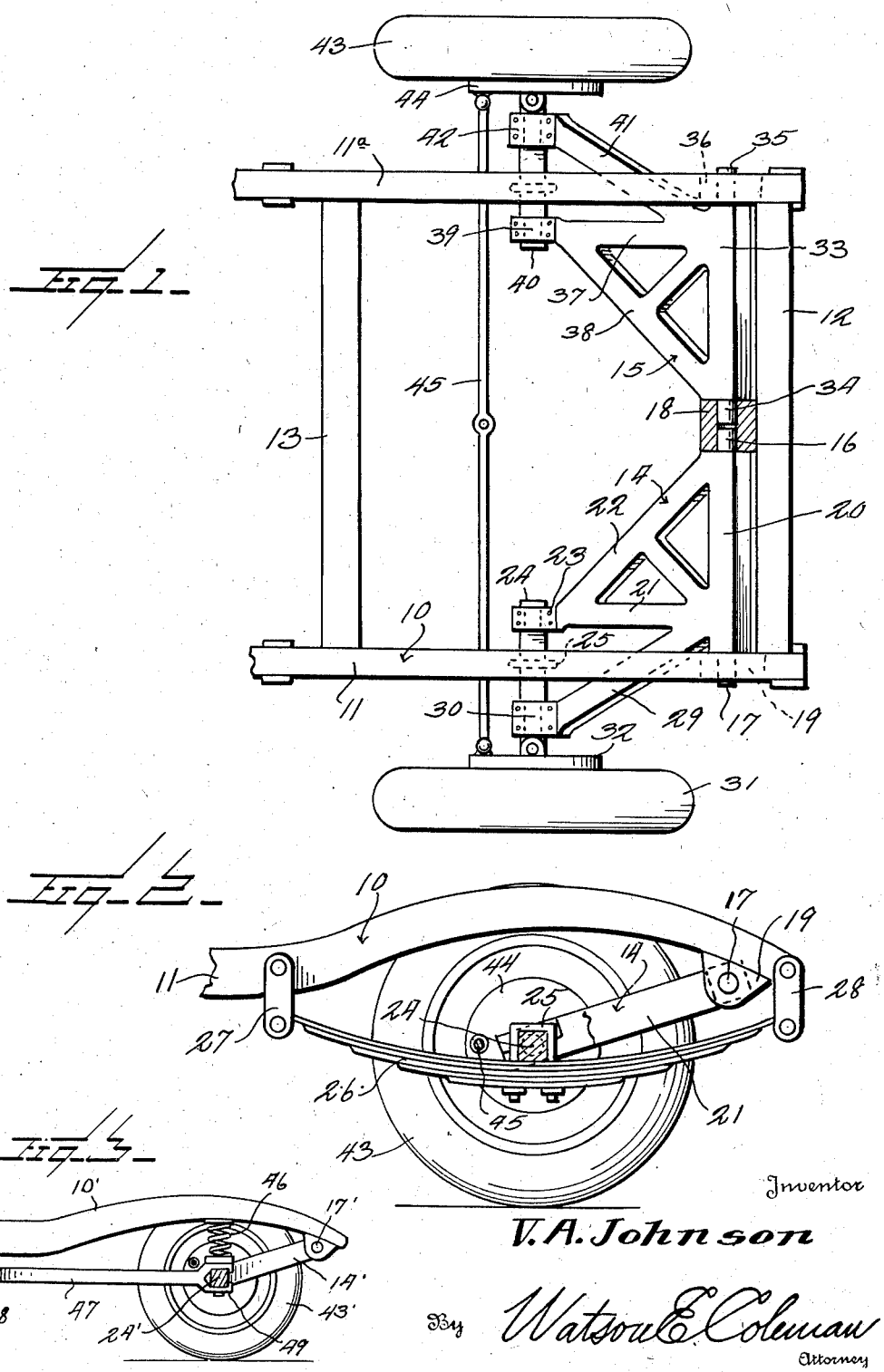

2,085,662

UNITED STATES PATENT OFFICE 2,085,662

VEHICLE SUSPENSION DEVICE

Valter A. Johnson, Wagoner, Okla.

Application October 8, 1935, Serial No. 44,115

2 Claims. (Cl. 267—19)

This invention relates to motor vehicle constructions and more particularly to a means for permitting independent vertical movement of the front wheels of the vehicle.

An object of this invention is to provide an exceedingly simple means, whereby, what is commonly termed, knee-action, may be obtained without the use of a complicated construction on each side of the vehicle at the front thereof.

Another object of this invention is to provide a knee-action which may be combined with the conventional arcuate or semi-elliptical springs.

A further object of this invention is to provide a suspension means for the wheels of a vehicle which is pivoted at one end to the frame of a vehicle and at the other end to the axle, the axle being fastened to the center of a conventional leaf spring structure.

The above and various other objects and advantages of this invention will in part be described in, and in part be understood from the following detail description of the present preferred embodiment, the same being illustrated in the accompanying drawing wherein:

Figure 1 is a fragmentary top plan of a vehicle frame structure having a wheel suspension means constructed according to an embodiment of this invention mounted thereon;

Figure 2 is a fragmentary side elevation partly broken away and in section of the device.

Figure 3 is a fragmentary side elevation partly in section of a modified form of this device.

Referring to the drawing wherein like numerals of reference designate corresponding parts throughout the several parts, the numeral 10 designates generally the frame or chassis of a vehicle which comprises side rails or frame members 11, disposed in parallel relation and held in parallel relation by means of transversely extending bars or frame members 12 and 13. The transverse frame members 12 are disposed adjacent the ends of the side frame members 11, and the transverse or intermediate bar 13 is disposed at a point or points intermediate the end bars 12. I do not wish to be limited to the particular type of vehicle frame structure, herein disclosed, as the hereinafter described invention may be mounted on other types of frames.

In order to provide a suspension means whereby independent vertical movement may be had of each wheel at the front of the vehicle frame 10, I have provided a pair of triangular shaped levers 14 and 15. These two triangular members 14 and 15 are of like construction and are disposed between the side frame members 11. The lever 14 is provided in the forward leg thereof, with trunnions 16 and 17 which are rockably mounted in bearings 18 and 19 respectively. The bearings 18 and 19 are preferably secured to the front transverse frame member 12 with the bearing 18 in substantially the transverse center of the frame 10. One side 20 of the lever 14 is disposed parallel with the frame member 12 and another side 21 is disposed substantially parallel with the side frame member 11 and connects with the hypotenuse member 22. A bearing 23 is carried by the convergent ends of the two lever members 21 and 22 and one end of a front axle 24 is journalled in the bearing 23. The axle 24 is secured as by a U-bolt or other fastening means 25 to a spring structure 26 secured as by shackles 27 and 28 to the side frame member 11. This spring structure 26 comprises a plurality of superposed arcuate leaves and is a conventional semi-elliptical spring, having the usual eyes at each end engaging the shackles 27 and 28. The axle 24 is preferably rectangular in transverse section at the point where the U-bolt 25 engages the axle so that this axle 24 will not turn relative to the spring 26.

The lever 14 also has an outwardly inclined arm or lever 29 which is integral therewith, and extends from the junction of the two sides 20 and 21 of the lever 14 to a point outside the frame member 11 and terminates in a bearing 30, in which the axle 24 on the outer side of the spring 26 is journalled. The axle 24 has a spindle secured thereto of conventional construction on which a wheel 31 is mounted. The wheel 31 may also have associated therewith, the usual brake structure designated 32, which, however, does not form any part of the present invention.

The lever 15 comprises a forward side member 33 having trunnions 34 and 35 journalled in bearings 18 and 36 respectively. A side bar 37 extends rearwardly of the front rail 12 and parallel with the opposite side member 11 and preferably on the inner side of the opposite side rail 11. A connecting member 38 connects the inner end of the front member 33 with the rear end of the side member 37 and a bearing 39 is carried by the junction between the two members 37 and 38. A second front axle 40 is journalled in the bearing 39 and is secured to a spring similar to the spring 26 and extends outwardly of the side member 11. An outwardly inclined arm 41 is formed integral with the lever structure 15 and has a bearing 42 in which the outer portion of the axle 40 is journalled. A wheel 43 is carried by a spindle structure which is mounted on the outer end of the axle 40. A brake structure 44 may be associated with the wheel 43. The two front wheels 31 and 43 may be tied together by a tie rod 45 which may be connected to the usual steering apparatus so that the two wheels 31 and 43 may be turned in the operation of the vehicle.

In the use and operation of the vehicle having the suspension means, hereinbefore described, mounted thereon, the frame 10 will be suspended by the semi-elliptical springs 26, there being one spring on each side of the vehicle frame at the front thereof. When the vehicle wheel strikes an obstruction, this wheel will move upwardly independent of the other wheel, and the upward movement will be on an arc, having a radius equal to the distance between the axial centers of the trunnions 16 and 17 and the axle 24. Preferably the trunnion 17 is disposed slightly inwardly of the forward end of the spring structure 26 and the spring 26 is permitted to have swinging movement in a forward and rearward direction by reason of the two shackles 27 and 28. Of course, this forward and rearward swinging movement will be prevented normally by the lever 14, but when this lever 14 moves up or down there will, by reason of this movement, be a slight forward and rearward movement of the axle 24. It will, therefore, be apparent that the wheel 31 may move independent of the wheel 43 or vice versa, so that the frame of the vehicle will not be unduly affected by the passage of one or the other of the front wheels over an obstruction. The lever members 14 and 15 are constructed of relatively strong material so that there will not be any twisting of the axles 24 and 40 respectively.

In Figure 3 there is shown a modified form of this device where the frame 10' has lever members 14' pivotally secured, as at 17', and the wheels 43' are mounted on an axle 24'. In this form the semi-elliptical spring is dispensed with and in place of this spring a coil spring 46 is interposed between the axle 24' and the under side of the frame 10'. A tie rod 47 is pivotally secured at its front end to a shackle 48 and the rear end of the tie rod 47 is bifurcated, as at 49, and engages about the axle 24'. This tie rod 47 will prevent undue reciprocation of the axle 24'.

It will also be apparent that this wheel suspension means will not readily get out of order, in view of the simplicity thereof and by reason of its simplicity the wheel suspension means may be made very rugged so as to withstand any of the shocks incident to the operation of the vehicle.

The suspension means herein disclosed may be used on either the front or rear end of the vehicle and may be used on any type of vehicle using wheels in order to provide a suspension means for the body of the vehicle.

It is, of course, understood that various changes and modifications may be made in the details of construction and design of the above specifically described embodiment of this invention without departing from the spirit thereof, such changes and modifications being restricted only by the scope of the following claims.

I claim:—

1. A suspension means for a vehicle frame comprising a pair of triangularly shaped levers disposed with one side thereof substantially parallel to a side of the frame and another side thereof parallel to an end of the frame, a pair of alined trunnions integral with each lever, one trunnion of one lever being in confronting position to a trunnion of the other lever, a central bearing for each of said confronting trunnions, outer bearings for the other trunnions of said levers carried by the frame, an outwardly extending bracing arm carried by each lever, means for pivotally securing an axle to a lever and an arm, and a spring secured to each axle between said arm and the lever and to the vehicle frame.

2. In a vehicle suspension means including a pair of pivoted axle supporting levers and cushioning means for said levers, each lever comprising a triangularly shaped member, alined trunnions integral with one side of said member, an axle bearing carried by said member opposite from said trunnions at the convergent end of the other sides of the member, an outwardly extending arm integral with the member, and a bearing carried by the free end of said arm alining with said first bearing.

VALTER A. JOHNSON.